United States Patent [19]
Schulze-Kadelbach et al.

[11] Patent Number: 5,514,458
[45] Date of Patent: May 7, 1996

[54] LARGE-SIZE PANEL OF THERMOPLASTIC SYNTHETIC RESIN FOR AUTOMOTIVE VEHICLE INTERIOR, AND PROCESS FOR THE PRODUCTION THEREOF

[75] Inventors: Roland Schulze-Kadelbach, Flein; Karlheinz Falk, Niedernhall, both of Germany

[73] Assignee: Konrad Hornschuch AG, Weissach, Germany

[21] Appl. No.: 98,387

[22] PCT Filed: Dec. 12, 1992

[86] PCT No.: PCT/EP92/02879

§ 371 Date: Aug. 12, 1993

§ 102(e) Date: Aug. 12, 1993

[87] PCT Pub. No.: WO93/11927

PCT Pub. Date: Jun. 24, 1993

[30] Foreign Application Priority Data

Dec. 13, 1991 [DE] Germany ............ 41 41 113.7

[51] Int. Cl.$^6$ .............. B32B 7/00; D03D 3/00; D04H 1/04; B27N 3/10
[52] U.S. Cl. .......... 428/246; 428/247; 428/286; 428/296; 428/300; 428/317.9; 428/253; 428/319.9; 428/252; 264/DIG. 65
[58] Field of Search ............ 428/290, 285, 428/300, 358, 286, 296, 246, 247, 283, 317.9, 304.4; 264/257, 258, 325, 327, DIG. 65

[56] References Cited

U.S. PATENT DOCUMENTS

| | | | |
|---|---|---|---|
| 4,451,539 | 5/1984 | Vallee et al. | 428/515 |
| 4,804,425 | 2/1989 | Hoffmann et al. | 156/79 |
| 4,997,707 | 3/1991 | Otawa et al. | 428/319.3 |
| 5,164,257 | 11/1992 | Haardt et al. | 428/317.9 |
| 5,188,882 | 2/1993 | Uchiyama et al. | 428/319.7 |

FOREIGN PATENT DOCUMENTS

| | | |
|---|---|---|
| 2656965 | 6/1978 | Germany. |
| 2849197 | 5/1980 | Germany. |
| 8023224 | 11/1980 | Germany. |
| 8023225 | 11/1980 | Germany. |
| 3340260 | 5/1985 | Germany. |
| 3626350 | 2/1988 | Germany. |
| 3802249 | 8/1988 | Germany. |
| 3722873 | 4/1989 | Germany. |
| 3737793 | 5/1989 | Germany. |
| 8909952 | 11/1989 | Germany. |
| 3842846 | 6/1990 | Germany. |
| 4005624 | 8/1991 | Germany. |
| 4032934 | 4/1992 | Germany. |
| 4030477 | 4/1992 | Germany. |
| 4030478 | 4/1992 | Germany. |

OTHER PUBLICATIONS

Bottger, W.: Three-Dimensional Fiber Reinforcements For Composite Materials, Kunststoffe 79, 1989 vol. 11, pp. 1228–1230.

Hoersch, F: Three-Dimensional Fiber Reinforcements For Composite Materials, Kunststoffe 80, 1990 vol. 9, pp. 1003–1007.

JP 58–222825A. In: Patent Abstracts Of Japan, M–288, Apr. 9, 1984, vol. 8, No. 76.

Primary Examiner—George F. Lesmes
Assistant Examiner—Kathryne E. Shelborne
Attorney, Agent, or Firm—Antonelli, Terry, Stout & Kraus

[57] ABSTRACT

A large-size paneling part made of thermoplastic synthetic resins for automotive vehicle interiors or equivalent uses includes a support made of polyolefin particle foam onto which is laminated a decorative layer of polymeric material having a predominantly polyolefin structure during forming of the molded part. This decorative layer includes a multi-layer knit mesh or woven fabric with incorporated spacers of preferably polyolefinic polymer threads, having a decorative textile surface. This layer may be laminated on the topside with a decoratively designed film, predominantly on the basis of olefinic polymers or, respectively, be laminated additionally on the rear side with a polyolefin film.

7 Claims, 1 Drawing Sheet

LARGE-SIZE PANEL OF THERMOPLASTIC SYNTHETIC RESIN FOR AUTOMOTIVE VEHICLE INTERIOR, AND PROCESS FOR THE PRODUCTION THEREOF

BACKGROUND OF THE INVENTION

The invention relates to large-size paneling parts of a thermoplastic synthetic resin for the interior of an automotive vehicle, and to a process for the production thereof.

Panels for the interior of an automotive vehicle along the lines of this invention are understood to mean, in particular, door side parts, headliners (finished dome liners), seat back linings, hat shelves, and side paneling of thermoplastic synthetic resins.

Molded parts as paneling parts in multilayer structure for uses in automotive vehicle interiors have been known for a long time. Such constructions usually consist of a compact supporting member of thermoplastic or thermosetting synthetic resins filled with various materials, or of fibrous starting materials converted, with the aid of suitable resins, into a mechanically load-bearing composite; see, in this connection, for example DOS 3,842,846.

The actual shaping process takes place according to the conventional methods primarily by press-molding, injection molding or in accordance with the RIM and, respectively, RRIM technology.

The basic components display the joint feature that their surface meets only very low decorative requirements. Decorative paneling members are obtained from these molded parts by joining these basic materials with decorative, flat products during the shaping step or also in separate procedures. These decorative, flat products can be imprinted and embossed plastic sheeting as well as woven, knit textiles or nonwovens.

In case a composite is produced by subsequent lamination, the bond between the decorative and, in some cases, soft and elastic top layer and the supporting molded member must be established with simultaneous application of pressure and heat and with the use of a special laminating material.

In pressing processes, flat products are placed into the tool utilized for the shaping step, and thereafter molded parts are produced having decorative, soft and elastic surfaces. Materials that can be processed according to the presently known techniques, and molded parts manufactured pursuant to such techniques exhibit a number of disadvantages:

The pressure to be expended during the press-molding step for the nonwoven mat production step ranges above 5–10 bar, in case of injection molding even above several hundred bar.

The materials employed normally are not based on a unitary polymer type so that the conventional molded parts can be recycled only for low-quality products.

The mass temperature during the shaping step lies, in case of thermoplastic materials, above 180°–200° C. and therefore leads to thermal damage to the top material in cases where the latter is not especially protected, for example by a film, foam sheet, or a similar material.

Molded parts produced in this way must be refinished in a second working step in order to produce a rounded border.

SUMMARY OF THE INVENTION

It is an object of the present invention to provide a structure for a molded part which no longer exhibits the aforementioned drawbacks of the conventional structures and makes it possible to obtain decorative surfaces of a higher quality.

In order to attain this object, the invention proposes to fashion a paneling member of thermoplastic synthetic resin. The molded parts of this invention are characterized particularly in that, during the process of shaping the molded part, a decorative layer of polymers having predominantly a polyolefinic structure is applied by laminating, this layer consisting of a multilayer knit or woven fabric with incorporated spacers of preferably polyolefinic polymer threads, and having a decorative, textile surface, or being laminated additionally on the topside with a decorative film—predominantly on the basis of olefinic polymers—or, respectively, is additionally laminated on the rear side with a polyolefin film. Another version resides in the use of a two-ply decorative layer of an outside compact layer and foamed sheeting, especially of a polyolefin. Preferred structures of the paneling members are molded parts of several layers (sandwich components), all based on the same polymer (preferably polyolefins) with soft, grained, or textile surfaces. The structure of the molded parts pursuant to the invention here ensures the prerequisites for the intended usage with respect to the prescribed technical specifications according to the present status. The disclosed process for producing the molded parts is economical and advantageous. The process provides an optically pleasing and esthetic design of the surfaces and offers a wide variation possibility.

In the process of this invention, the posed objective has been attained according to a process wherein the decorative layer is formed in a separate working step and is thereafter placed in a mold having walls of a microporous material, the decorative layer being shaped and embossed in the mold by application of a vacuum. Subsequently, pre-expanded polyolefin particles are loaded into the mold and are expanded to form a support for the decorative layer and to bond with the decorative layer.

The invention achieves a reduction of the total weight of the sandwich component (support plus decorative layer) for paneling members by at least 50%.

By applying the technique described in DOS 4,008,173, varying densities in the supporting member of the molded part can also advantageously be attained for the present invention.

In addition, the present invention solves the recycling problem for these parts in that only components are utilized which are built up on a common, recyclable polymer basis.

Preferably, the decorative material employed is a compact film in conjunction with foam sheeting or with a spacer fabric mesh, with or without a coating on the topside.

These materials used in accordance with the invention have the feature in common that they consist of jointly recyclable polyolefins and/or polyolefin composites, just as the thin layer optionally provided on their underside, being of the same material also used for the expandable plastic granulated substance for the basic material of the support. Consequently, the additional application of an adhesion-promoting layer as the laminating layer between the decorative layer and the supporting member is eliminated.

Conventional expandable synthetic resin granules (beads) are employed as the basic material for the supporting layer, consisting of thermoplastic synthetic resins, optionally with proportions of blowing gas, and being pre-expanded. Suitable thermoplastic resins are, for example, polyethylene (PE) of medium density and polypropylene (PP) which can contain, if desired, further auxiliary agents, such as stabilizers, pigments, fillers, etc., as well as copolymers of polyolefins or compounds of homo- and copolymers. The size of these pre-expanded granules is about 2–5 mm. The shape of these granules is spherical or approximately spherical.

Preferably, the respectively identical plastic is utilized for the basic material and the sheeting.

The mold utilized according to this invention is made from a microporous material displaying on the inside the desired surface texture as a negative of the subsequent molded part.

The production of such molded parts is also described in the specification of DE 38 42 846 A1. In this disclosure, the surface is to be produced in the soft-elastic range by the pressure of the foam beads and the subsequent vapor pressure. Based on the indicated operating temperatures and mode of operation, a thermally stable embossing or texturing of the surface cannot be expected. Also the use of a microporous mold is disclosed in this laid-open application, but merely for the extraction of air and moisture.

In contrast to this patent, a positive mold is utilized according to the process of this invention, the surface of this mold carrying the grained texture of the finished part. Galvanic molds are primarily used for this purpose, manufactured in correspondence with Patent DE 37 43 809 C2. By the application of a vacuum, the heated-through decorative layer is applied by suction to the surface and embossed; in this procedure, the decorative layer and the mold wall can optionally be preheated to close to below the crystallite melting temperature of the surface material in order to produce a clean and thermally stable grained texture.

After formation of the decorative layer, the granules (beads) are filled in the cold or slightly preheated condition into a mold equipped with steam-supplying nozzles through which superheated steam can be introduced with a temperature of about 130° C. and under a pressure of about 6 bar.

After the mold has been filled, it is closed, and the granules are heated, expanded and fused according to the conventional method.

An essential feature of this invention is the use of a decorative layer based on a moldable material, such as a nonwoven mat or a fabric or a knit material, optionally with spacers or an expanded polyolefin sheeting or such a sheeting consisting of a multilayer structure representing a laminate of compact and foamed polyolefin sheets, the grained texture of which on the decorative side is produced by deep-drawing in correspondingly designed vacuum molds provided with the negative embossing.

The basis for the decorative layer is constituted primarily by a mesh of polyolefin fibers of differing denier, also called spacer mesh. Preferably, fibers are used with a denier of between 0.5 and 1.5 dtex. The mesh is produced so that its thickness ranges between 0.4 and 2.5 mm with a density of below 0.5 g/cm$^1$.

The structure of the spacer mesh consists chracteristically of at least two knit layers joined together by means of pile threads, the so-called spacers, manufactured according to conventional methods of the double-rib loom technique. In addition to the spacing of the two layers and thus also the thickness of the total layer, it is possible to adjust, within wide limits, the elongation, elasticity and strength of such a mesh.

These spacer meshes are optionally laminated on one side with a sheeting of polyolefins (thermocompression bonding) and embossed in the same operating step with the use of a textured microporous vacuum die as the mold. The embossing depth ranges between 60 and 150 μm. The color of the sheeting can be set as desired. Embossing of the sheeting can take place either beforehand with engraved steel rolls under pressure or, alternatively, in the mold by means of an appropriate mold surface and with the use of vacuum.

In case a textile surface is desired, the top film can also be omitted. In this case, knit or woven fabrics are used, the topside of which has already been provided with a corresponding design during the knitting step.

Alternatively, smooth films without embossing can be utilized which can be embossed subsequently in conjunction with the mesh or the foam sheeting, for example in accordance with a vacuum technique.

The total structure of the decorative layer, including the films laminated thereon, corresponds in its properties to the PVC foam sheeting used nowadays but, in contrast to the latter, is made completely on the basis of one polymer, for example polyolefins, and therefore fulfills, along the lines of this invention, the requirement for uniformity of material.

After the molded parts have been produced, they can be processed and/or enhanced in further working steps, in a similar way as this is done with conventional parts.

DETAILED DESCRIPTION OF THE INVENTION

Figure 1:
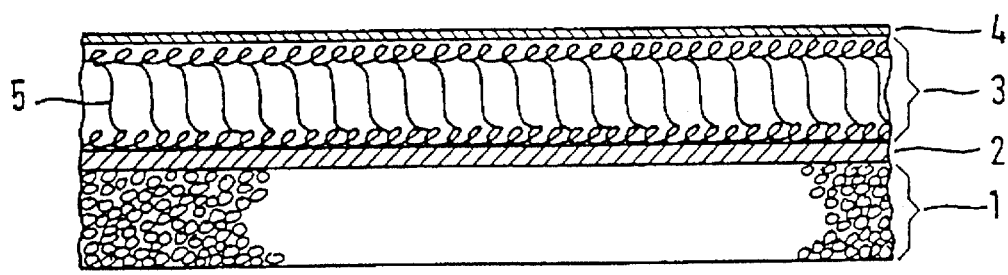
FIG. 1 shows a cross-sectional view of one embodiment of the invention containing fabric material within the decorative layer.

One embodiment for a molded part having the structure of this invention for use as a paneling member is illustrated in FIG. 1. In this illustration, the basic part, namely the supporting member 1, produced from expanded polyolefin particles, is bonded to a film 2 of the same material as the supporting member and with a spacer mesh 3 with pile threads 5 of polyolefin and a compact layer 4 of a polyolefin. The layers 3, 4 form the decorative layer with a backing layer constituted by the film 2.

Other possible structures of a paneling member consist, for example, of a supporting member 1, a film 2, and a spacer mesh 3 with a textile decorative surface. Another version is represented, for example, by a paneling member of a supporting member 1 and a decorative layer 4.

Figure 2:
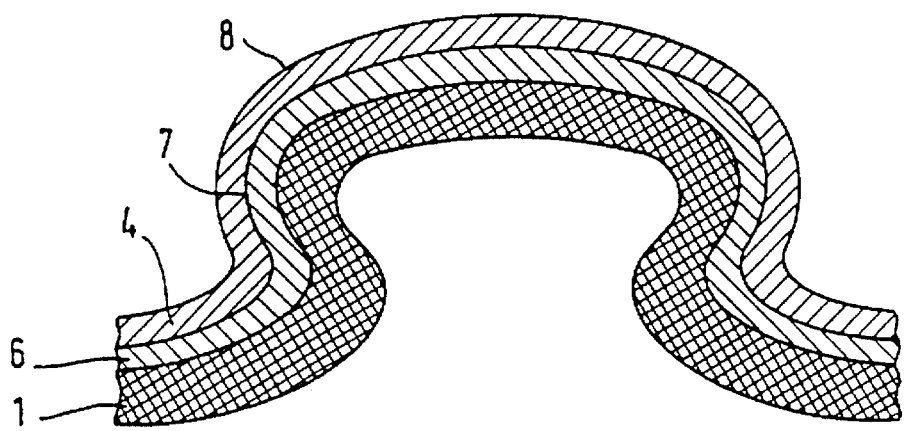
FIG. 2 shows a cross-sectional view of another embodiment of the invention containing polymeric foam sheeting in the decorative layer.

FIG. 2 shows a further embodiment of the paneling member according to this invention. The paneling member is a laminate consisting of a supporting layer 1 of PP particle foam, an intermediate layer 6 of extruded PP foam sheeting, and a compact PP decorative film 4. The individual layers are cemented together by suitable adhesives 7; the decorative film (top layer) is sealed with flat varnish 8.

In the present process, the particle foam and the decorative layers are produced in different processes and bonded in a further process. The PP foam layer 6 and the decorative layer 4 are bonded and, after sealing the front side and application of the adhesive and/or of a primer to the rear side, are vacuum molded in accordance with the form of the supporting layer 1. In the same working step, this composite is bonded to the supporting layer 1.

The invention will be described in greater detail with reference to practical examples.

EXAMPLE 1

A decorative layer consisting of a spacer mesh laminated to a decoratively designed film based on a polyolefinic compound is inserted in a microporous mold, preheated, preferably to about 110°–130° C., and thereafter brought into contact with the mold surface through the microporous walls thereof with a vacuum pressure of about 0.8 bar. The edges and corners of this decorative layer were previously folded inwardly for this purpose and provisionally fixed in place. Subsequently, pre-expanded granules of polypropylene are poured into the mold cavity lined with the decorative layer, the mold is closed, and bonding is effected by the action of steam, pressure and heat so that there is achieved, on the one hand, a bond in the manner of a welding bond among the foam granules and, on the other hand, a bond of the foam granules to the decorative layer in contact therewith. The wall thickness of the molded part is, at the thinnest point, about 3 mm and, at the thickest point, about 7 mm. The surface area of the molded part is about 1.2 m$^2$.

The granules are in this case filled into the microporous mold and bonded, with steam having a temperature of 142° C. and under a pressure of 3.5 bar, to form a flat molded part 1, the granules being expanded at the same time.

EXAMPLE 2

A decorative layer consisting of a spacer mesh laminated with an untextured polyolefin film is placed into a microporous mold with a textured surface. By preheating with infrared and application of a vacuum, the film is pulled into the microporous mold together with the spacer mesh in such a way that the texturing of the mold surface forms a permanent embossing in the film. Thereafter, as described in Example 1, the molded part is finished up.

EXAMPLE 3

A spacer mesh decorated on the topside by the application of a design and laminated on the rear side with a thin film as a sealing layer made of polypropylene is inserted in a microporous mold and then kept in place by suction and preformed until it is in contact with the surfaces of the mold. Then, as described in Example 1, the molded part is formed by introduction of polypropylene foam granules and subsequent expansion.

What is claimed is:

1. A large-size panel of thermoplastic synthetic resin for the interior of an automotive vehicle which comprises a molded part comprising a support and a decorative layer, said support consisting of polyolefin particle foam onto which the decorative layer comprising a polyolefin structure, is secured by laminating during shaping of the molded part, said decorative layer comprising a multilayered knit mesh or woven fabric having incorporated therein spacers of polyolefin threads, consisting of at least two knit layers joined together by said spacers and being laminated optionally on the topside with a decoratively designed film predominantly comprising an olefin polymer to provide a decorative textile topside and on the rear side with a polyolefin film, and said support being laminated to said decorative layer during foaming of the polyolefin particle foam.

2. The molded part according to claim 1, wherein the molded part exhibits varying densities throughout the support and the decorative layer of between 0.1 and 0.4 g/cm$^2$.

3. The molded part according to claim 1, wherein the molded part is formed to have a surface area of up to 2.5 m$^2$.

4. The molded part according to claim 1, wherein the molded part has a thickness between 1.5 mm and 100 mm.

5. The molded part according to claim 1, wherein the decorative layer comprises a spacer knit mesh of polyolefin fibers having a denier of between 0.5 and 1.5 dtex.

6. The molded part according to claim 1, wherein the weight per unit area of the decorative layer ranges between 0.1 and 0.5 g/cm$^2$.

7. The molded part according to claim 1, wherein the decorative layer has a thickness of between 0.4 mm and 2.5 mm.

* * * * *